US011541543B2

(12) United States Patent
Vu et al.

(10) Patent No.: US 11,541,543 B2
(45) Date of Patent: *Jan. 3, 2023

(54) DYNAMIC, INTERACTIVE SIGNALING OF SAFETY-RELATED CONDITIONS IN A MONITORED ENVIRONMENT

(71) Applicants: Clara Vu, Cambridge, MA (US); Scott Denenberg, Newton, MA (US); Abraham K. Feldman, Somerville, MA (US)

(72) Inventors: Clara Vu, Cambridge, MA (US); Scott Denenberg, Newton, MA (US); Abraham K. Feldman, Somerville, MA (US)

(73) Assignee: VEO ROBOTICS, INC., Waltham, MA (US)

( * ) Notice: Subject to any disclaimer, the term of this patent is extended or adjusted under 35 U.S.C. 154(b) by 336 days.

This patent is subject to a terminal disclaimer.

(21) Appl. No.: 16/919,963

(22) Filed: Jul. 2, 2020

(65) Prior Publication Data

US 2020/0331146 A1 Oct. 22, 2020

Related U.S. Application Data

(63) Continuation-in-part of application No. 15/889,767, filed on Feb. 6, 2018, now Pat. No. 10,882,185.
(Continued)

(51) Int. Cl.
*B25J 9/16* (2006.01)
*B25J 19/02* (2006.01)
(Continued)

(52) U.S. Cl.
CPC ......... *B25J 9/1676* (2013.01); *B25J 19/023* (2013.01); *G05B 19/4061* (2013.01);
(Continued)

(58) Field of Classification Search
CPC ...... B25J 9/1666; B25J 9/1697; B25J 9/1676; G01S 17/04; G01S 17/87; G01S 7/4808;
(Continued)

(56) References Cited

U.S. PATENT DOCUMENTS 6,212,444 B1 4/2001 Kato et al.
6,297,844 B1 10/2001 Schatz et al.
(Continued)

FOREIGN PATENT DOCUMENTS

EP 3248740 11/2017
WO 2016122840 8/2016
(Continued)

OTHER PUBLICATIONS

International Search Report, for International Application No. PCT/US2018/016991, dated May 16, 2019, 12 pages.
(Continued)

*Primary Examiner* — Masud Ahmed
(74) *Attorney, Agent, or Firm* — Morgan, Lewis & Bockius LLP

(57) ABSTRACT

Systems and methods for determining safe and unsafe zones in a workspace—where safe actions are calculated in real time based on all relevant objects (e.g., some observed by sensors and others computationally generated based on analysis of the sensed workspace) and on the current state of the machinery (e.g., a robot) in the workspace—may utilize a variety of workspace-monitoring approaches as well as dynamic modeling of the robot geometry. The future trajectory of the robot(s) and/or the human(s) may be forecast using, e.g., a model of human movement and other forms of control. Modeling and forecasting of the robot may, in some embodiments, make use of data provided by the robot controller that may or may not include safety guarantees.

24 Claims, 7 Drawing Sheets

Related U.S. Application Data

(60) Provisional application No. 62/455,834, filed on Feb. 7, 2017, provisional application No. 62/455,828, filed on Feb. 7, 2017.

(51) Int. Cl.

| | | |
|---|---|---|
| *G05B 19/4061* | (2006.01) | |
| *G06F 3/01* | (2006.01) | |
| *G06T 19/20* | (2011.01) | |
| *G06K 9/62* | (2022.01) | |
| *G06T 15/20* | (2011.01) | |

(52) U.S. Cl.
CPC ............ *G06F 3/011* (2013.01); *G06K 9/6218* (2013.01); *G06T 15/205* (2013.01); *G06T 19/20* (2013.01); *G05B 2219/32014* (2013.01); *G05B 2219/50193* (2013.01); *G06T 2219/2012* (2013.01)

(58) Field of Classification Search
CPC ......... G01S 17/89; G06T 17/10; G06T 17/05; G05B 2219/40202; G01V 8/20; Y10S 901/49; Y10S 901/47
See application file for complete search history.

(56) References Cited

U.S. PATENT DOCUMENTS

| | | | |
|---|---|---|---|
| 6,816,755 B2 | 11/2004 | Habibi et al. | |
| 7,336,814 B2 | 2/2008 | Boca et al. | |
| 8,154,590 B2 | 4/2012 | Krissel et al. | |
| 8,253,792 B2 | 8/2012 | Wells et al. | |
| 8,437,535 B2 | 5/2013 | Boca et al. | |
| 8,559,699 B2 | 10/2013 | Boca | |
| 8,700,197 B2 | 4/2014 | Placiennik et al. | |
| 9,043,025 B2 | 5/2015 | Brooks et al. | |
| 9,122,266 B2* | 9/2015 | Franke | G05B 19/4061 |
| 9,240,070 B2 | 1/2016 | Anderson-Sprecher et al. | |
| 9,283,678 B2 | 3/2016 | Kuffer, Jr. et al. | |
| 9,452,531 B2 | 9/2016 | Kikkeri et al. | |
| 9,691,151 B1 | 6/2017 | Anderson-Sprecher et al. | |
| 9,734,401 B2 | 8/2017 | Hunt | |
| 9,740,193 B2 | 8/2017 | Hunt | |
| 9,827,681 B2 | 11/2017 | Naitou et al. | |
| 10,099,372 B2 | 10/2018 | Vu et al. | |
| 10,445,944 B2 | 10/2019 | Galera et al. | |
| 2005/0055134 A1* | 3/2005 | Okuda | B25J 9/1666 |
| | | | 700/245 |
| 2005/0207618 A1 | 9/2005 | Wohler et al. | |
| 2008/0021597 A1 | 1/2008 | Merte et al. | |
| 2008/0152192 A1 | 6/2008 | Zhu et al. | |
| 2009/0015663 A1 | 1/2009 | Doettling et al. | |
| 2010/0092032 A1* | 4/2010 | Boca | B25J 9/1679 |
| | | | 382/103 |
| 2011/0264266 A1 | 10/2011 | Kock | |
| 2012/0022689 A1* | 1/2012 | Kapoor | B25J 9/1666 |
| | | | 700/255 |
| 2013/0201292 A1 | 8/2013 | Walter et al. | |
| 2014/0093130 A1 | 4/2014 | Dasu et al. | |
| 2015/0049911 A1 | 2/2015 | Dottling et al. | |
| 2015/0131896 A1* | 5/2015 | Hu | B25J 9/1676 |
| | | | 382/153 |
| 2015/0269427 A1 | 9/2015 | Kim et al. | |
| 2015/0293600 A1* | 10/2015 | Sears | H04N 13/271 |
| | | | 345/156 |
| 2016/0016315 A1* | 1/2016 | Kuffner, Jr. | B25J 9/1676 |
| | | | 700/255 |
| 2016/0167231 A1* | 6/2016 | Nakayama | B25J 9/1676 |
| | | | 700/255 |
| 2016/0282126 A1 | 9/2016 | Watts et al. | |
| 2016/0354927 A1* | 12/2016 | Kikkeri | B25J 9/1676 |
| 2017/0057095 A1 | 3/2017 | Oestergaard et al. | |
| 2017/0151676 A1 | 6/2017 | Atherton et al. | |
| 2017/0197311 A1* | 7/2017 | Garcia | G01S 15/931 |
| 2017/0210017 A1* | 7/2017 | Yamamoto | B25J 9/1697 |
| 2017/0302905 A1 | 10/2017 | Shteinfeld et al. | |
| 2017/0334063 A1 | 11/2017 | Kimatsuzaki et al. | |
| 2017/0334066 A1 | 11/2017 | Levine et al. | |
| 2017/0334076 A1 | 11/2017 | Bordegnoni et al. | |
| 2017/0341231 A1 | 11/2017 | Tan et al. | |
| 2017/0355079 A1 | 12/2017 | Takahashi | |
| 2019/0061158 A1 | 2/2019 | Vu et al. | |

FOREIGN PATENT DOCUMENTS

| | | |
|---|---|---|
| WO | 2017199261 | 11/2017 |
| WO | 2017203937 | 11/2017 |
| WO | 2017207436 | 12/2017 |

OTHER PUBLICATIONS

Anandan, Tanya M. "The Shrinking Footprint of Robot Safety," Robotics Online, Oct. 6, 2014, 9 pages.

Anandan, Tanya M., ":The End of Separation: Man and Robot as Collaborative Coworkers on the Factory Floor," Robotics Online, Jun. 6, 2013, 8 pages.

Cui, et al., "Robotics Safety: An Engineering Teaching Module," University of Ontario, Institute of Technology, Minerva Canada, Mar. 2014, 39 pages.

Fetzner, et al., "Obstacle Detection and Tracking for Safe Human-Robot Interaction Based on Multi-Sensory Point Clouds".

Flacco, et al., "A Depth Space Approach to Human-Robot Collision Avoidance," 2012 IEEE International Conference on Robotics and Automation, May 14-18, 2012, 8 pages.

Frank, Rudiger, Dr., "Modular Sensor System for Safe Robots", https://www.automalion.com/automalion-news/article/modular-sensor-system-for-safe-robots, Nov. 25, 2017, 14 pages.

Frese, et al., "Multi-Sensor Obstacle Tracking for Safe Human-Robot Interaction," Fraunhofer Institute of Optronics, System Technologies and Image Explitation IOSB, 2014, 8 pages.

Graham, et al., "A Sensory-Based Robotic Safety System," IEE Proceedings, vol. 132, Pt D, No. 4, Jul. 1985, 7 pages.

Graham, et al., "A Safety and Collision Avoidance System for Industrial Robots," IEEE Transactions on Industry Applications, vol. IA-22, No. 1, Jan./Feb. 1986, 9 pages.

Kock, et al., "Taming the robot," Robotic Highlights, ABB Review, Apr. 2006, 4 pages.

Lacevic, et al., "Kinetostatic danger field—A novel safety assessment for human-robot interation," Research Gate, Jun. 9, 2016, 8 pages.

Lasota, et al., "A Survey of Methods for Safe Human-Robt Interation," Foundations and Trends in Robotics, vol. 5, No. 4 (2014), 92 pages.

Lasota, et al., "Toward Safe Close-Proximity Human-Robot Interaction with Standard Industrial Robots," IEEE, 2014, 7 pages.

Lenz, et al., "Fusing multiple Kinects to survey shared Human-Robot-Workspaces," Robotics and Embedded Systems Department of Informatics Technische Universit at Munchen, 6 pages.

Murray, et al., "Robot Motion Planning on a Chip," Departments of Computer Science and Electrical & Computer Engineering Duke University, 9 pages.

Pilz, GB, "Safe human-robot collaboration: from theory to practice," https:/lwww.pilz.com/en-GB/company/news/Article/084837, Aug. 6, 2015, 4 pages.

Rybski, et al., "Sensor Fusion for Human Safety in Industrial Workcells," Carnegie Mellon University Research Showcase© CMU, Oct. 2012, 9 pages.

ABB Robotics Produce Management, "SafeMove2," Jul. 24, 2017, 25 pages.

ABB Robotics Produce Management, "SafeMove2 Protecting operators & enhancing robot safety,", abb.com/robotics, 2 pages.

Vogel, et al., "A Projection-based Sensor System for Safe Physical Human-Robot Collaboration," 2013 IEEE/RSJ International Conference on Intelligent Robots and Systems (IROS), Nov. 3-7, 2013, 6 pages.

(56) References Cited

OTHER PUBLICATIONS

Zanchettin, et al., "Safety in Human-Robert Collabroative Manufacturing Environments: Metrics and Control," IEEE Transactions on Automation Science and Engineering, vol. 13, No. 2, Apr. 2016, 12 pages.

Christiernin, et al., "Safety Critical Robot Programming and Testing for Operations in Industrial Co-production," IEEE International Symposium on Software Reliability Engineering Workshops, 2014, 4 pages.

\* cited by examiner

DYNAMIC, INTERACTIVE SIGNALING OF SAFETY-RELATED CONDITIONS IN A MONITORED ENVIRONMENT

CROSS-REFERENCE TO RELATED APPLICATION

This is a continuation-in-part of U.S. Ser. No. 15/889,767, filed on Feb. 6, 2018, which claims priority to and the benefit of U.S. Provisional Patent Application Nos. 62/455,828 and 62/455,834, both filed on Feb. 7, 2017. The foregoing documents are incorporated herein by reference in their entireties.

FIELD OF THE INVENTION

The field of the invention relates, generally, to monitoring of industrial environments where humans and machinery interact or come into proximity, and in particular to systems and methods for visually identifying safe and unsafe regions in a monitored workspace.

BACKGROUND

Industrial machinery is often dangerous to humans. Some machinery is dangerous unless it is completely shut down, while other machinery may have a variety of operating states, some of which are hazardous and some of which are not. In some cases, the degree of hazard may depend on the location or distance of the human with respect to the machinery. As a result, many "guarding" approaches have been developed to separate humans and machines and to prevent machinery from causing harm to humans. One very simple and common type of guarding is simply a cage that surrounds the machinery, configured such that opening the door of the cage causes an electrical circuit to place the machinery in a safe state. Safety may be guaranteed by placing the door sufficiently far from the machinery to ensure that the human cannot reach the machine before it shuts down. Of course, this prevents all interaction between human and machine, and severely constrains use of the workspace.

Despite their significant limitations, traditional safeguarding systems have one clear advantage in that it is straightforward for a human worker to recognize conditions in which they may trigger the safety device and cause machinery to halt. More sophisticated three-dimensional (3D) sensing and analysis approaches allow much closer and more fluid collaboration between humans and machinery, but the sophistication of the approach means that it can be difficult for the human operator to evaluate the potential impact of their actions on the system under control.

In particular, in a system that implements dynamic, 3D speed and separation monitoring, decisions to slow, stop, or otherwise alter the behavior of the machinery under control are made based on the arbitrary proximity of a human (or what might potentially be a human) to a piece of dangerous machinery, and/or a projection of the expected locations of the human and machinery at some point in the near future. These observations and decisions are not necessarily apparent to a human worker. This could cause significant problems in a manufacturing setting where unexpected stops or slowdowns of machinery can have negative effects on productivity and on the operation of subsequent steps in the production process.

Therefore, a human-readable visualization of how the system is making decisions, in particular what aspects of the scene the system is using to make its decisions and what projections it is making about expected future actions would be highly advantageous. It would, for example, enable humans to effectively interact with machinery in workcells using complex safeguarding.

SUMMARY

Embodiments of the present invention provide systems and methods for determining safe and unsafe zones in a workspace, where safe actions are calculated in real time based on all relevant objects (e.g., some observed by sensors and others computationally generated based on analysis of the sensed workspace) and on the current state of the machinery (e.g., a robot) in the workspace. These systems and methods may, but need not, utilize the workspace-monitoring approaches described in the detailed description below. Embodiments of the invention perform dynamic modeling of the robot geometry and forecast the future trajectory of the robot(s) and/or the human(s), using, e.g., a model of human movement and other forms of control. Modeling and forecasting of the robot may, in some embodiments, make use of data provided by the robot controller that may or may not include safety guarantees. However, the invention can provide a safety guarantee in either case by independent validation of this data and the use of a safety-rated stop function.

Accordingly, in a first aspect, the invention relates to a system for perceptibly indicating a condition associated with regions in a 3D workspace including industrial machinery. In various embodiments, the system comprises a plurality of sensors distributed about the workspace, where each of the sensors is associated with a grid of pixels for recording images of a portion of the workspace within a sensor field of view and the workspace portions collectively cover the entire workspace; a computer memory for storing (i) a plurality of images from the sensors and (ii) a model of the machinery and its permitted movements during performance of the activity; a source for generating perceptible signals in the workspace; and a processor configured to computationally generate, from the stored images, a 3D spatial representation of the workspace; identify a first 3D region of the workspace corresponding to space occupied by the machinery within the workspace augmented by a 3D envelope around the machinery spanning the permitted movements in accordance with a stored model; identify a second 3D region of the workspace corresponding to space occupied or potentially occupied, by a human within the workspace augmented by a 3D envelope around the human corresponding to anticipated movements of the human within the workspace within a predetermined future time; and operating the signal source to perceptibly indicate, to humans within the workspace, a degree of the condition in the first and second regions.

In some embodiments, the signal is colored illumination. For example, the condition may be safety and different colors may correspond to different safety levels. In various embodiments, the signal source is a plurality of lamps distributed about the workspace and the processor may be configured to control directionalities and beam shapes of the lamps. In other embodiments, the workspace has a floor including a grid of illumination devices for selectively illuminating portions of the floor in colors corresponding to safety levels associated with volumetric regions extending upward from the floor portions. In still other embodiments, the degrees of the condition appear in a 2D display or a virtual reality device. The signal may also be audible or include an audible component. For example, if the condition is safety, the audible signal may be a varying amplitude and/or a frequency corresponding to a dynamically changing safety level as a human moves within the workspace.

In some embodiments, the processor implements a safety protocol specifying a minimum separation distance between the machinery and a human, the degrees of the condition corresponding to different separation distances. The workspace may be computationally represented as a plurality of voxels or in any other suitable electronic format.

In another aspect, the invention pertains to a method of perceptibly indicating a condition associated with regions in a 3D workspace including industrial machinery. In various embodiments, the method comprises the steps of monitoring the workspace with a plurality of sensors distributed thereabout, where each of the sensors is associated with a grid of pixels for recording images of a portion of the workspace within a sensor field of view and the workspace portions collectively cover the entire workspace; registering the sensors with respect to each other so that the images obtained by the sensors collectively represent the workspace; storing, in a computer memory, (i) a plurality of images from the sensors and (ii) a model of the machinery and its permitted movements during performance of the activity; computationally generating, from the stored images, a 3D spatial representation of the workspace; computationally identifying a first 3D region of the workspace corresponding to space occupied by the machinery within the workspace augmented by a 3D envelope around the machinery spanning the permitted movements in accordance with the stored model; computationally identifying a second 3D region of the workspace corresponding to space occupied, or potentially occupied, by a human within the workspace augmented by a 3D envelope around the human corresponding to anticipated movements of the human within the workspace within a predetermined future time; and generating a signal to perceptibly indicate, to humans within the workspace, a degree of the condition in the first and second regions.

In some embodiments, the signal is colored illumination. For example, the condition may be safety and different colors may correspond to different safety levels. Generating the signal may comprise controlling directionalities and beam shapes of the lamps. In other embodiments, the workspace has a floor including a grid of illumination devices for selectively illuminating portions of the floor in colors corresponding to safety levels associated with volumetric regions extending upward from the floor portions. The signal may also be audible or include an audible component. For example, if the condition is safety, the audible signal may be a varying amplitude and/or a frequency corresponding to a dynamically changing safety level as a human moves within the workspace.

The method may include implementing a safety protocol specifying a minimum separation distance between the machinery and a human, where the degrees of the condition correspond to different separation distances. The workspace may be computationally represented as a plurality of voxels or in any other suitable electronic format.

In still another aspect, the invention relates to a system for perceptibly indicating information in a digitally represented 3D workspace including industrial machinery in which, in various embodiments, the system comprises a plurality of sensors distributed about the workspace, where each of the sensors is associated with a grid of pixels for recording images of a portion of the workspace within a sensor field of view and the workspace portions collectively cover the entire workspace; a computer memory for storing (i) a plurality of images from the sensors and (ii) a model of the machinery and its permitted movements during performance of the activity; a source for generating perceptible signals; and a processor configured to computationally generate, from the stored images, a 3D spatial representation of the workspace; identify, from the images, at least one observed feature appearing in at least one of the images from the sensors, at least one computationally based feature not appearing in any of the images from the sensors; and operate the signal source to perceptibly indicate at least one observed feature and at least one computationally based feature.

In some embodiments, each observed feature is represented in the computer memory as a voxel cluster, a depth image, a mesh, a bounding box, or a line. In various embodiments, a first one of the observed features is machinery; a first one of the computationally based features is a 3D envelope around the machinery in the workspace and spanning permitted movements of the machinery in accordance with a stored model; and a second one of the computationally based features is space potentially occupied by a human or a human appendage. A third one of the computationally based features may be a distance (e.g., a minimum distance) between the first and second computationally based features, where the signal source is operable by the processor to show the third computationally based feature as a line between the first and second computationally based features. Alternatively or in addition, the signal source may be operable by the processor to show whether a slowdown or stop is necessary or is predicted to become necessary within a predetermined time based on a minimum distance between the first and second computationally based features.

In some embodiments, a first one of the observed features is a recognized physical object in the workspace and the signal source is operable by the processor to display a representation of the object with a color indicating its type. For example, the signal source may be operable by the processor to display contents of the workspace in grayscale as a background.

In various embodiments, a first one of the observed features is a recognized workpiece in the workspace and the signal source is operable by the processor to display a representation of the workpiece showing a deviation from an expected position thereof. A first one of the computationally generated features may be a keep-out zone or a keep-in zone, and the signal source may be operable by the processor to display a representation of the zone in the workspace.

In various embodiments, a first one of the computationally generated features is a cluster of voxels corresponding to a spatial region in the workspace that none of the sensors can observe, and the signal source is operable by the processor to display the cluster of voxels in a representation of the workspace. Alternatively or in addition, the signal source may be operable by the processor to display a representation of an object with a color indicating its state. For example, the signal source may be a VR headset or a 2D display.

Yet another aspect of the invention pertains to a method of perceptibly indicating information associated with voxel clusters in a digitally represented 3D workspace including industrial machinery, where the method comprises, in various embodiments, the steps of monitoring the workspace with a plurality of sensors distributed thereabout, each of the sensors being associated with a grid of pixels for recording images of a portion of the workspace within a sensor field of view, the workspace portions collectively covering the entire workspace; registering the sensors with respect to each other so that the images obtained by the sensors collectively represent the workspace; storing, in a computer memory, (i) a plurality of images from the sensors and (ii) a model of the machinery and its permitted movements during performance of the activity; computationally generating, from the stored images, a 3D spatial representation of the workspace; computationally identifying, from the images, at least one observed feature appearing in at least one of the images from the sensors and at least one computationally based feature not appearing in any of the images from the sensors; and generating a signal to perceptibly indicate at least one observed feature and at least one computationally based feature. Each observed feature may be digitally represented as a voxel cluster, a depth image, a mesh, a bounding box, or a line.

In various embodiments, a first one of the identified computationally based features is a 3D envelope around machinery in the workspace and spanning permitted movements of the machinery in accordance with a stored model; and a second one of the computationally based features is space potentially occupied by a human or a human appendage. In some embodiments, a third one of the computationally based features is a minimum distance between the first and second computationally based features, and the signal shows the third computationally based feature as a line between the first and second computationally based features. The signal may show whether a slowdown or stop is necessary or is predicted to become necessary within a predetermined time based on a minimum distance between the first and second computationally based features.

In some embodiments, a first one of the observed features is a recognized physical object in the workspace and the signal causes display of a representation of the object with a color overlay indicating its type. For example, the signal source may be operable by the processor to display contents of the workspace in grayscale as a background. A first one of the observed features may a recognized workpiece, in which case the signal may cause display of a representation of the workpiece showing a deviation from an expected position thereof. A first one of the computationally generated features may be a keep-out zone or a keep-in zone, in which case the signal may cause display of a representation of the zone in the workspace. Alternatively or in addition, a first one of the computationally generated features may be a cluster of voxels corresponding to a spatial region in the workspace that none of the sensors can observe, and the signal may cause display of the cluster of voxels in a representation of the workspace.

In general, as used herein, the term "substantially" means±10%, and in some embodiments, ±5%. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

In the following discussion, we describe an integrated system for monitoring a workspace, classifying regions therein for safety purposes, and dynamically identifying safe states. In some cases the latter function involves semantic analysis of a robot in the workspace and identification of the workpieces with which it interacts. It should be understood, however, that these various elements may be implemented separately or together in desired combinations; the inventive aspects discussed herein do not require all of the described elements, which are set forth together merely for ease of presentation and to illustrate their interoperability. The system as described represents merely one embodiment.

1. Workspace Monitoring

Figure 1:
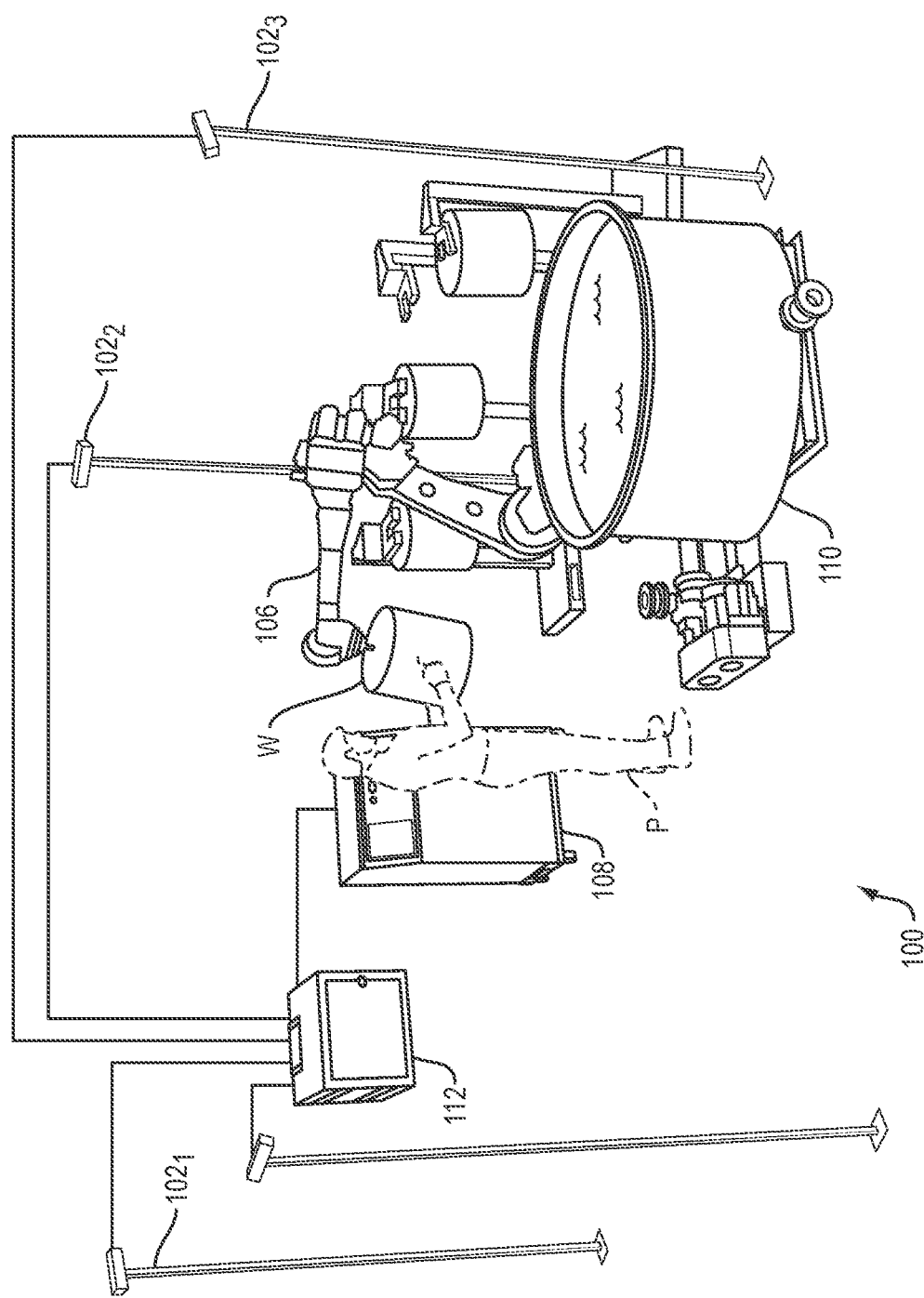
FIG. 1 is a perspective view of a monitored workspace in accordance with an embodiment of the invention.

Refer first to FIG. 1, which illustrates a representative 3D workspace 100 monitored by a plurality of sensors representatively indicated at $102_1$, $102_2$, $102_3$. The sensors 102 may be conventional optical sensors such as cameras, e.g., 3D time-of-flight cameras, stereo vision cameras, or 3D LIDAR sensors or radar-based sensors, ideally with high frame rates (e.g., between 30 Hz and 100 Hz). The mode of operation of the sensors 102 is not critical so long as a 3D representation of the workspace 100 is obtainable from images or other data obtained by the sensors 102. As shown in the figure, sensors 102 collectively cover and can monitor the workspace 100, which includes a robot 106 controlled by a conventional robot controller 108. The robot interacts with various workpieces W, and a person P in the workspace 100 may interact with the workpieces and the robot 106. The workspace 100 may also contain various items of auxiliary equipment 110, which can complicate analysis of the workspace by occluding various portions thereof from the sensors. Indeed, any realistic arrangement of sensors will frequently be unable to "see" at least some portion of an active workspace. This is illustrated in the simplified arrangement of FIG. 1: due to the presence of the person P, at least some portion of robot controller 108 may be occluded from all sensors. In an environment that people traverse and where even stationary objects may be moved from time to time, the unobservable regions will shift and vary.

Figure 2:
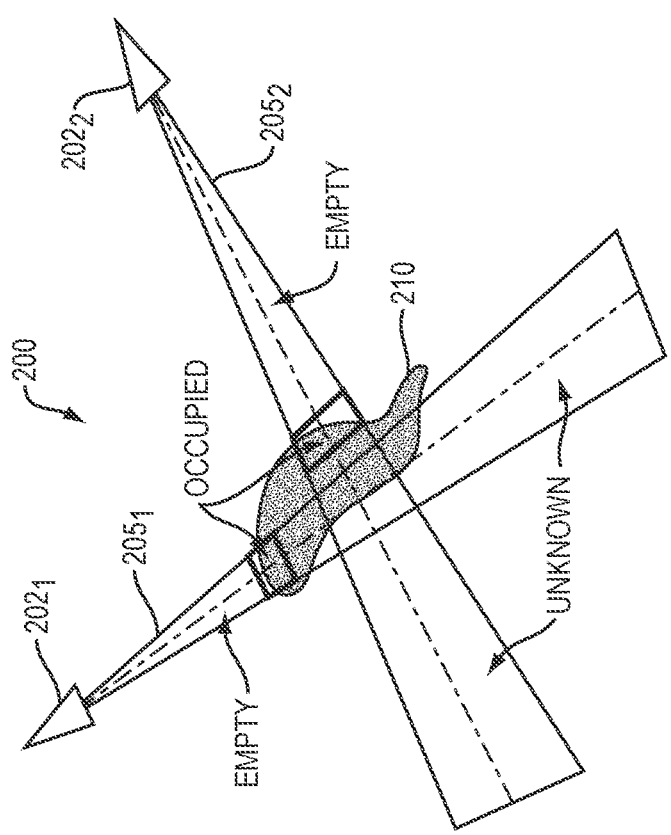
FIG. 2 schematically illustrates classification of regions within the monitored workspace in accordance with an embodiment of the invention.

As shown in FIG. 2, embodiments of the present invention classify workspace regions as occupied, unoccupied (or empty), or unknown. For ease of illustration, FIG. 2 shows two sensors $202_1$, $202_2$ and their zones of coverage $205_1$, 2052 within the workspace 200 in two dimensions; similarly, only the 2D footprint 210 of a 3D object is shown. The portions of the coverage zones 205 between the object boundary and the sensors 202 are marked as unoccupied, because each sensor affirmatively detects no obstructions in this intervening space. The space at the object boundary is marked as occupied. In a coverage zone 205 beyond an object boundary, all space is marked as unknown; the corresponding sensor is configured to sense occupancy in this region but, because of the intervening object 210, cannot do so.

With renewed reference to FIG. 1, data from each sensor 102 is received by a control system 112. The volume of space covered by each sensor—typically a solid cone—may be represented in any suitable fashion, e.g., the space may be divided into a 3D grid of small (5 cm, for example) cubes or "voxels" or other suitable form of volumetric representation. For example, workspace 100 may be represented using 2D or 3D ray tracing, where the intersections of the 2D or 3D rays emanating from the sensors 102 are used as the volume coordinates of the workspace 100. This ray tracing can be performed dynamically or via the use of precomputed volumes, where objects in the workspace 100 are previously identified and captured by control system 112. For convenience of presentation, the ensuing discussion assumes a voxel representation; control system 112 maintains an internal representation of the workspace 100 at the voxel level, with voxels marked as occupied, unoccupied, or unknown.

Figure 3:
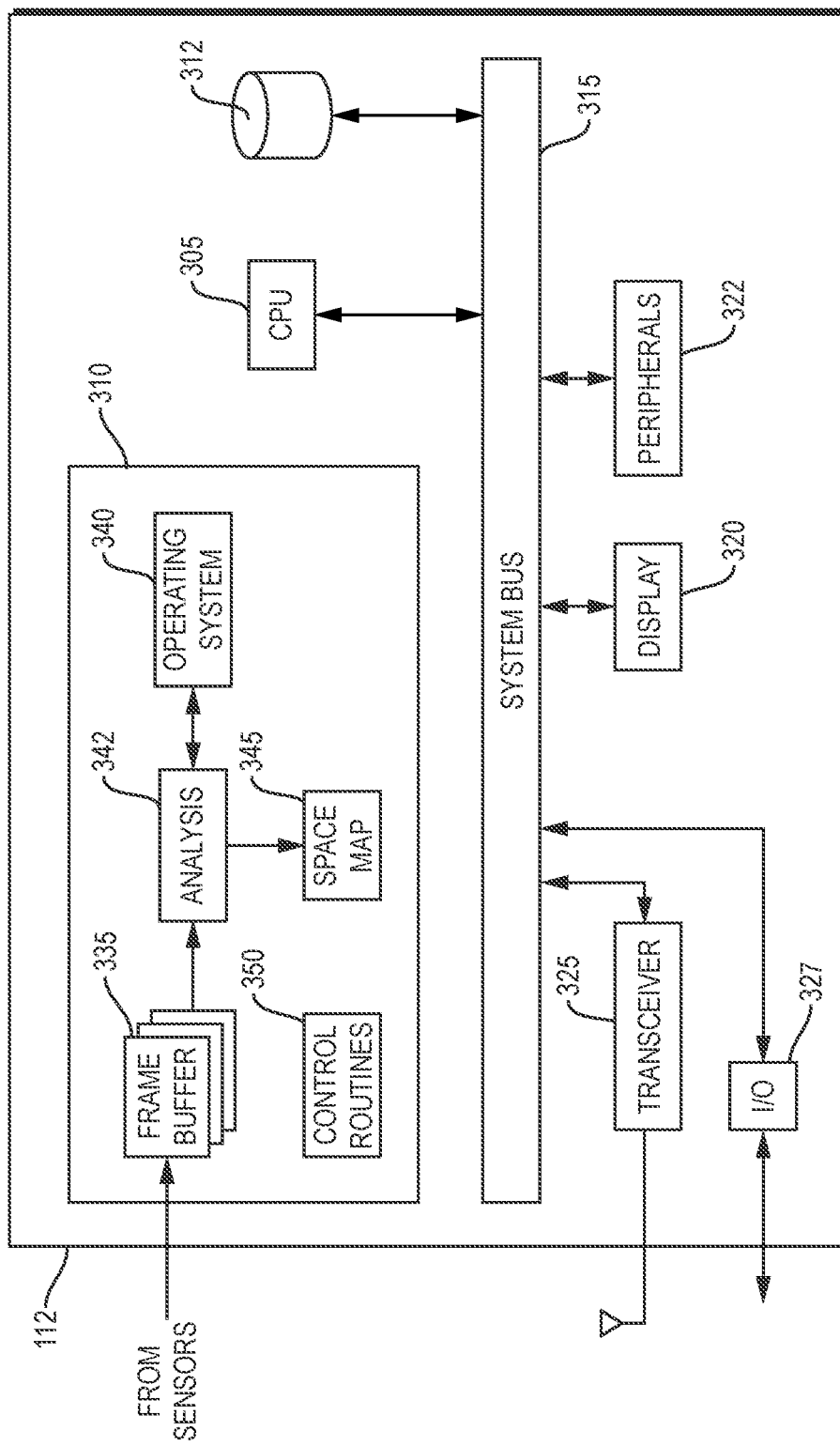
FIG. 3 schematically illustrates a control system in accordance with an embodiment of the invention.

FIG. 3 illustrates, in greater detail, a representative embodiment of control system 112, which may be implemented on a general-purpose computer. The control system 112 includes a central processing unit (CPU) 305, system memory 310, and one or more non-volatile mass storage devices (such as one or more hard disks and/or optical storage units) 312. The system 112 further includes a bidirectional system bus 315 over which the CPU 305, memory 310, and storage device 312 communicate with each other as well as with internal or external input/output (I/O) devices such as a display 320 and peripherals 322, which may include traditional input devices such as a keyboard or a mouse). The control system 112 also includes a wireless transceiver 325 and one or more I/O ports 327. Transceiver 325 and I/O ports 327 may provide a network interface. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter; for example, a supervisor may establish communication with control system 112 using a tablet that wirelessly joins the network. When used in a WAN networking environment, computers typically include a modem or other communication mechanism. Modems may be internal or external, and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), BLUETOOTH, ZigBee, IrDa, near-field communication (NFC), or other suitable protocol. Furthermore, components of the system may communicate through a combination of wired or wireless paths, and communication may involve both computer and telecommunications networks.

CPU 305 is typically a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the invention.

The system memory 310 contains a series of frame buffers 335, i.e., partitions that store, in digital form (e.g., as pixels or voxels, or as depth maps), images obtained by the sensors 102; the data may actually arrive via I/O ports 327 and/or transceiver 325 as discussed above. System memory 310 contains instructions, conceptually illustrated as a group of modules, that control the operation of CPU 305 and its interaction with the other hardware components. An operating system 340 (e.g., Windows or Linux) directs the execution of low-level, basic system functions such as memory allocation, file management and operation of mass storage device 312. At a higher level, and as described in greater detail below, an analysis module 342 registers the images in frame buffers 335 and analyzes them to classify regions of the monitored workspace 100. The result of the classification may be stored in a space map 345, which contains a volumetric representation of the workspace 100 with some or all voxels (or other unit of representation) labeled, within the space map, as described herein. Alternatively, space map 345 may simply be a 3D array of voxels, with voxel labels being stored in a separate database (in memory 310 or in mass storage 312).

Control system 112 may also control the operation or machinery in the workspace 100 using conventional control routines collectively indicated at 350. As explained below, the configuration of the workspace and, consequently, the classifications associated with its voxel representation may well change over time as persons and/or machines move about, and control routines 350 may be responsive to these changes in operating machinery to achieve high levels of safety. All of the modules in system memory 310 may be programmed in any suitable programming language, including, without limitation, high-level languages such as C, C++, C#, Ada, Basic, Cobra, Fortran, Java, Lisp, Perl, Python, Ruby, or low-level assembly languages.

1.1 Sensor Registration

In a typical multi-sensor system, the precise location of each sensor 102 with respect to all other sensors is established during setup. Sensor registration is usually performed automatically, and should be as simple as possible to allow for ease of setup and reconfiguration. Assuming for simplicity that each frame buffer 335 stores an image (which may be refreshed periodically) from a particular sensor 102, analysis module 342 may register sensors 102 by comparing all or part of the image from each sensor to the images from other sensors in frame buffers 335, and using conventional computer-vision techniques to identify correspondences in those images. Suitable global-registration algorithms, which do not require an initial registration approximation, generally fall into two categories: feature-based methods and intensity-based methods. Feature-based methods identify correspondences between image features such as edges while intensity-based methods use correlation metrics between intensity patterns. Once an approximate registration is identified, an Iterative Closest Point (ICP) algorithm or suitable variant thereof may be used to fine-tune the registration.

If there is sufficient overlap between the fields of view of the various sensors 102, and sufficient detail in the workspace 100 to provide distinct sensor images, it may be sufficient to compare images of the static workspace. If this is not the case, a "registration object" having a distinctive signature in 3D can be placed in a location within workspace 100 where it can be seen by all sensors. Alternatively, registration can be achieved by having the sensors 102 record images of one or more people standing in the workspace or walking throughout the workspace over a period of time, combining a sufficient number of partially matching images until accurate registration is achieved.

Registration to machinery within the workspace 100 can, in some cases, be achieved without any additional instrumentation, especially if the machinery has a distinctive 3D shape (for example, a robot arm), so long as the machinery is visible to at least one sensor registered with respect to the others. Alternatively, a registration object can be used, or a user interface, shown in display 320 and displaying the scene observed by the sensors, may allow a user to designate certain parts of the image as key elements of the machinery under control. In some embodiments, the interface provides an interactive 3D display that shows the coverage of all sensors to aid in configuration. If the system is be configured with some degree of high-level information about the machinery being controlled (for purposes of control routines 350, for example)—such as the location(s) of dangerous part or parts of the machinery and the stopping time and/or distance—analysis module 342 may be configured to provide intelligent feedback as to whether the sensors are providing sufficient coverage, and suggest placement for additional sensors.

For example, analysis module 342 can be programmed to determine the minimum distance from the observed machinery at which it must detect a person in order to stop the machinery by the time the person reaches it (or a safety zone around it), given conservative estimates of walking speed. (Alternatively, the required detection distance can be input directly into the system via display 320.) Optionally, analysis module 342 can then analyze the fields of view of all sensors to determine whether the space is sufficiently covered to detect all approaches. If the sensor coverage is insufficient, analysis module 342 can propose new locations for existing sensors, or locations for additional sensors, that would remedy the deficiency. Otherwise, the control system will default to a safe state and control routines 350 will not permit machinery to operate unless analysis module 342 verifies that all approaches can be monitored effectively. Use of machine learning and genetic or evolutionary algorithms can be used to determine optimal sensor placement within a cell. Parameters to optimize include but are not limited to minimizing occlusions around the robot during operation and observability of the robot and workpieces.

If desired, this static analysis may include "background" subtraction. During an initial startup period, when it may be safely assumed there are no objects intruding into the workspace 100, analysis module 342 identifies all voxels occupied by the static elements. Those elements can then be subtracted from future measurements and not considered as potential intruding objects. Nonetheless, continuous monitoring is performed to ensure that the observed background image is consistent with the space map 345 stored during the startup period. Background can also be updated if stationary objects are removed or are added to the workspace.

There may be some areas that sensors 102 cannot observe sufficiently to provide safety, but that are guarded by other methods such as cages, etc. In this case, the user interface can allow the user to designate these areas as safe, overriding the sensor-based safety analysis. Safety-rated soft-axis and rate limitations can also be used to limit the envelope of the robot to improve performance of the system.

Once registration has been achieved, sensors 102 should remain in the same location and orientation while the workspace 100 is monitored. If one or more sensors 102 are accidentally moved, the resulting control outputs will be invalid and could result in a safety hazard. Analysis module 342 may extend the algorithms used for initial registration to monitor continued accuracy of registration. For example, during initial registration analysis module 342 may compute a metric capturing the accuracy of fit of the observed data to a model of the work cell static elements that is captured during the registration process. As the system operates, the same metric can be recalculated. If at any time that metric exceeds a specified threshold, the registration is considered to be invalid and an error condition is triggered; in response, if any machinery is operating, a control routine 350 may halt it or transition the machinery to a safe state.

1.2 Identifying Occupied and Potentially Occupied Areas

Once the sensors have been registered, control system 112 periodically updates space map 345—at a high fixed frequency (e.g., every analysis cycle) in order to be able to identify all intrusions into workspace 100. Space map 345 reflects a fusion of data from some or all of the sensors 102. But given the nature of 3D data, depending on the locations of the sensors 102 and the configuration of workspace 100, it is possible that an object in one location will occlude the sensor's view of objects in other locations, including objects (which may include people or parts of people, e.g. arms) that are closer to the dangerous machinery than the occluding object. Therefore, to provide a reliably safe system, the system monitors occluded space as well as occupied space.

In one embodiment, space map 345 is a voxel grid. In general, each voxel may be marked as occupied, unoccupied or unknown; only empty space can ultimately be considered safe, and only when any additional safety criteria—e.g., minimum distance from a piece of controlled machinery—is satisfied. Raw data from each sensor is analyzed to determine whether, for each voxel, an object or boundary of the 3D mapped space has been definitively detected in the volume corresponding to that voxel. To enhance safety, analysis module 342 may designate as empty only voxels that are observed to be empty by more than one sensor 102. Again, all space that cannot be confirmed as empty is marked as unknown. Thus, only space between a sensor 102 and a detected object or mapped 3D space boundary along a ray may be marked as empty.

If a sensor detects anything in a given voxel, all voxels that lie on the ray beginning at the focal point of that sensor and passing through the occupied voxel, and which are between the focal point and the occupied voxel, are classified as unoccupied, while all voxels that lie beyond the occupied voxel on that ray are classified as occluded for that sensor; all such occluded voxels are considered "unknown." Information from all sensors may be combined to determine which areas are occluded from all sensors; these areas are considered unknown and therefore unsafe. Analysis module 342 may finally mark as "unoccupied" only voxels or workspace volumes that have been preliminarily marked at least once (or, in some embodiments, at least twice) as "unoccupied." Based on the markings associated with the voxels or discrete volumes within the workspace, analysis module 342 may map one or more safe volumetric zones within space map 345. These safe zones are outside a safety zone of the machinery and include only voxels or workspace volumes marked as unoccupied.

A common failure mode of active optical sensors that depend on reflection, such as LIDAR and time-of-flight cameras, is that they do not return any signal from surfaces that are insufficiently reflective, and/or when the angle of incidence between the sensor and the surface is too shallow. This can lead to a dangerous failure because this signal can be indistinguishable from the result that is returned if no obstacle is encountered; the sensor, in other words, will report an empty voxel despite the possible presence of an obstacle. This is why ISO standards for e.g. 2D LIDAR sensors have specifications for the minimum reflectivity of objects that must be detected; however, these reflectivity standards can be difficult to meet for some 3D sensor modalities such as time-of-flight. In order to mitigate this failure mode, analysis module 342 marks space as empty only if some obstacle is definitively detected at further range along the same ray. By pointing sensors slightly downward so that most of the rays will encounter the floor if no obstacles are present, it is possible to conclusively analyze most of the workspace 100. But if the sensed light level in a given voxel is insufficient to definitively establish emptiness or the presence of a boundary, the voxel is marked as unknown. The signal and threshold value may depend on the type of sensor being used. In the case of an intensity-based 3D sensor (for example, a time-of-flight camera) the threshold value can be a signal intensity, which may be attenuated by objects in the workspace of low reflectivity. In the case of a stereo vision system, the threshold may be the ability to resolve individual objects in the field of view. Other signal and threshold value combinations can be utilized depending on the type of sensor used.

A safe system can be created by treating all unknown space as though it were occupied. However, in some cases this may be overly conservative and result in poor performance. It is therefore desirable to further classify unknown space according to whether it could potentially be occupied. As a person moves within a 3D space, he or she will typically occlude some areas from some sensors, resulting in areas of space that are temporarily unknown (see FIG. 1). Additionally, moving machinery such as an industrial robot arm can also temporarily occlude some areas. When the person or machinery moves to a different location, one or more sensors will once again be able to observe the unknown space and return it to the confirmed-empty state in which it is safe for the robot or machine to operate. Accordingly, in some embodiments, space may also be classified as "potentially occupied." Unknown space is considered potentially occupied when a condition arises where unknown space could be occupied. This could occur when unknown space is adjacent to entry points to the workspace or if unknown space is adjacent to occupied or potentially occupied space. The potentially occupied space "infects" unknown space at a rate that is representative of a human moving through the workspace. Potentially occupied space stays potentially occupied until it is observed to be empty. For safety purposes, potentially occupied space is treated the same as occupied space. It may be desirable to use probabilistic techniques such as those based on Bayesian filtering to determine the state of each voxel, allowing the system to combine data from multiple samples to provide higher levels of confidence in the results. Suitable models of human movement, including predicted speeds (e.g., an arm may be raised faster than a person can walk), are readily available.

2. Classifying Objects

For many applications, the classification of regions in a workspace as described above may be sufficient—e.g., if control system 112 is monitoring space in which there should be no objects at all during normal operation. In many cases, however, it is desirable to monitor an area in which there are at least some objects during normal operation, such as one or more machines and workpieces on which the machine is operating. In these cases, analysis module 342 may be configured to identify intruding objects that are unexpected or that may be humans. One suitable approach to such classification is to cluster individual occupied voxels into objects that can be analyzed at a higher level.

To achieve this, analysis module 342 may implement any of several conventional, well-known clustering techniques such as Euclidean clustering, K-means clustering and Gibbs-sampling clustering. Any of these or similar algorithms can be used to identify clusters of occupied voxels from 3D point cloud data. Mesh techniques, which determine a mesh that best fits the point-cloud data and then use the mesh shape to determine optimal clustering, may also be used. Once identified, these clusters can be useful in various ways.

One simple way clustering can be used is to eliminate small groups of occupied or potentially occupied voxels that are too small to possibly contain a person. Such small clusters may arise from occupation and occlusion analysis, as described above, and can otherwise cause control system 112 to incorrectly identify a hazard. Clusters can be tracked over time by simply associating identified clusters in each image frame with nearby clusters in previous frames or using more sophisticated image-processing techniques. The shape, size, or other features of a cluster can be identified and tracked from one frame to the next. Such features can be used to confirm associations between clusters from frame to frame, or to identify the motion of a cluster. This information can be used to enhance or enable some of the classification techniques described below. Additionally, tracking clusters of points can be employed to identify incorrect and thus potentially hazardous situations. For example, a cluster that was not present in previous frames and is not close to a known border of the field of view may indicate an error condition.

In some cases it may be sufficient to filter out clusters below a certain size and to identify cluster transitions that indicate error states. In other cases, however, it may be necessary to further classify objects into one or more of four categories: (1) elements of the machinery being controlled by system 112, (2) the workpiece or workpieces that the machinery is operating on, and (3) other foreign objects, including people, that may be moving in unpredictable ways and that can be harmed by the machinery. It may or may not be necessary to conclusively classify people versus other unknown foreign objects. It may be necessary to definitively identify elements of the machinery as such, because by definition these will always be in a state of "collision" with the machinery itself and thus will cause the system to erroneously stop the machinery if detected and not properly classified. Similarly, machinery typically comes into contact with workpieces, but it is typically hazardous for machinery to come into contact with people. Therefore, analysis module 342 should be able to distinguish between workpieces and unknown foreign objects, especially people.

Elements of the machinery itself may be handled for classification purposes by the optional background-subtraction calibration step described above. In cases where the machinery changes shape, elements of the machinery can be identified and classified, e.g., by supplying analysis module 342 with information about these elements (e.g., as scalable 3D representations), and in some cases (such as industrial robot arms) providing a source of instantaneous information about the state of the machinery. Analysis module 342 may be "trained" by operating machinery, conveyors, etc. in isolation under observation by the sensors 102, allowing analysis module 342 to learn their precise regions of operation resulting from execution of the full repertoire of motions and poses. Analysis module 342 may classify the resulting spatial regions as occupied.

Conventional computer-vision techniques may be employed to enable analysis module 342 to distinguish between workpieces and humans. These include deep learning, a branch of machine learning designed to use higher levels of abstraction in data. The most successful of these deep-learning algorithms have been convolutional neural networks (CNNs) and more recently recurrent neural networks (RNNs). However, such techniques are generally employed in situations where accidental misidentification of a human as a non-human does not cause safety hazards. In order to use such techniques in the present environment, a number of modifications may be needed. First, machine-learning algorithms can generally be tuned to prefer false positives or false negatives (for example, logistic regression can be tuned for high specificity and low sensitivity). False positives in this scenario do not create a safety hazard—if the robot mistakes a workpiece for a human, it will react conservatively. Additionally, multiple algorithms or neural networks based on different image properties can be used, promoting the diversity that may be key to achieving sufficient reliability for safety ratings. One particularly valuable source of diversity can be obtained by using sensors that provide both 3D and 2D image data of the same object. If any one technique identifies an object as human, the object will be treated as human. Using multiple techniques or machine-learning algorithms, all tuned to favor false positives over false negatives, sufficient reliability can be achieved. In addition, multiple images can be tracked over time, further enhancing reliability—and again every object can be treated as human until enough identifications have characterized it as non-human to achieve reliability metrics. Essentially, this diverse algorithmic approach, rather than identifying humans, identifies things that are definitely not humans.

In addition to combining classification techniques, it is possible to identify workpieces in ways that do not rely on any type of human classification at all. One approach is to configure the system by providing models of workpieces. For example, a "teaching" step in system configuration may simply supply images or key features of a workpiece to analysis module 342, which searches for matching configurations in space map 345, or may instead involve training of a neural network to automatically classify workpieces as such in the space map. In either case, only objects that accurately match the stored model are treated as workpieces, while all other objects are treated as humans.

Another suitable approach is to specify particular regions within the workspace, as represented in the space map 345, where workpieces will enter (such as the top of a conveyor belt). Only objects that enter the workspace in that location are eligible for treatment as workpieces. The workpieces can then be modeled and tracked from the time they enter the workspace until the time they leave. While a monitored machine such as a robot is handling a workpiece, control system 112 ensures that the workpiece is moving only in a manner consistent with the expected motion of the robot end effector. Known equipment such as conveyor belts can also be modeled in this manner. Humans may be forbidden from entering the work cell in the manner of a workpiece—e.g., sitting on conveyors.

All of these techniques can be used separately or in combination, depending on design requirements and environmental constraints. In all cases, however, there may be situations where analysis module 342 loses track of whether an identified object is a workpiece. In these situations the system should fall back to a safe state. An interlock can then be placed in a safe area of the workspace where a human worker can confirm that no foreign objects are present, allowing the system to resume operation.

In some situations a foreign object enters the workspace, but subsequently should be ignored or treated as a workpiece. For example, a stack of boxes that was not present in the workspace at configuration time may subsequently be placed therein. This type of situation, which will become more common as flexible systems replace fixed guarding, may be addressed by providing a user interface (e.g., shown in display 320 or on a device in wireless communication with control system 112) that allows a human worker to designate the new object as safe for future interaction. Of course, analysis module 342 and control routines 350 may still act to prevent the machinery from colliding with the new object, but the new object will not be treated as a potentially human object that could move towards the machinery, thus allowing the system to handle it in a less conservative manner.

3. Generating Control Outputs

At this stage, analysis module 342 has identified all objects in the monitored area 100 that must be considered for safety purposes. Given this data, a variety of actions can be taken and control outputs generated. During static calibration or with the workspace in a default configuration free of humans, space map 345 may be useful to a human for evaluating sensor coverage, the configuration of deployed machinery, and opportunities for unwanted interaction between humans and machines. Even without setting up cages or fixed guards, the overall workspace layout may be improved by channeling or encouraging human movement through the regions marked as safe zones, as described above, and away from regions with poor sensor coverage.

Control routines 350, responsive to analysis module 342, may generate control signals to operating machinery, such as robots, within workspace 100 when certain conditions are detected. This control can be binary, indicating either safe or unsafe conditions, or can be more complex, such as an indication of what actions are safe and unsafe. The simplest type of control signal is a binary signal indicating whether an intrusion of either occupied or potentially occupied volume is detected in a particular zone. In the simplest case, there is a single intrusion zone and control system 112 provides a single output indicative of an intrusion. This output can be delivered, for example, via an I/O port 327 to a complementary port on the controlled machinery to stop or limit the operation of the machinery. In more complex scenarios, multiple zones are monitored separately, and a control routine 350 issues a digital output via an I/O port 327 or transceiver 325 addressed, over a network, to a target piece of machinery (e.g., using the Internet protocol or other suitable addressing scheme).

Another condition that may be monitored is the distance between any object in the workspace and a machine, comparable to the output of a 2D proximity sensor. This may be converted into a binary output by establishing a proximity threshold below which the output should be asserted. It may also be desirable for the system to record and make available the location and extent of the object closest to the machine. In other applications, such as a safety system for collaborative industrial robotics, the desired control output may include the location, shape, and extent of all objects observed within the area covered by the sensors 102.

4. Safe Action Constraints and Dynamic Determination of Safe Zones

ISO 10218 and ISO/TS 15066 describe speed and separation monitoring (SSM) as a safety function that can enable collaboration between an industrial robot and a human worker. Risk reduction is achieved by maintaining at least a protective separation distance between the human worker and robot during periods of robot motion. This protective separation distance is calculated using information including robot and human worker position and movement, robot stopping distance, measurement uncertainty, system latency and system control frequency. When the calculated separation distance decreases to a value below the protective separation distance, the robot system is stopped. This methodology can be generalized beyond industrial robotics to machinery.

For convenience, the following discussion focuses on dynamically defining a safe zone around a robot operating in the workspace 100. It should be understood, however, that the techniques described herein apply not only to multiple robots but to any form of machinery that can be dangerous when approached too closely, and which has a minimum safe separation distance that may vary over time and with particular activities undertaken by the machine. As described above, a sensor array obtains sufficient image information to characterize, in 3D, the robot and the location and extent of all relevant objects in the area surrounding the robot at each analysis cycle. (Each analysis cycle includes image capture, refresh of the frame buffers, and computational analysis; accordingly, although the period of the analysis or control cycle is short enough for effective monitoring to occur in real time, it involves many computer clock cycles.) Analysis module 342 utilizes this information along with instantaneous information about the current state of the robot at each cycle to determine instantaneous, current safe action constraints for the robot's motion. The constraints may be communicated to the robot, either directly by analysis module 342 or via a control routine 350, to the robot via transceiver 325 and/or I/O port 327.

Figure 4:
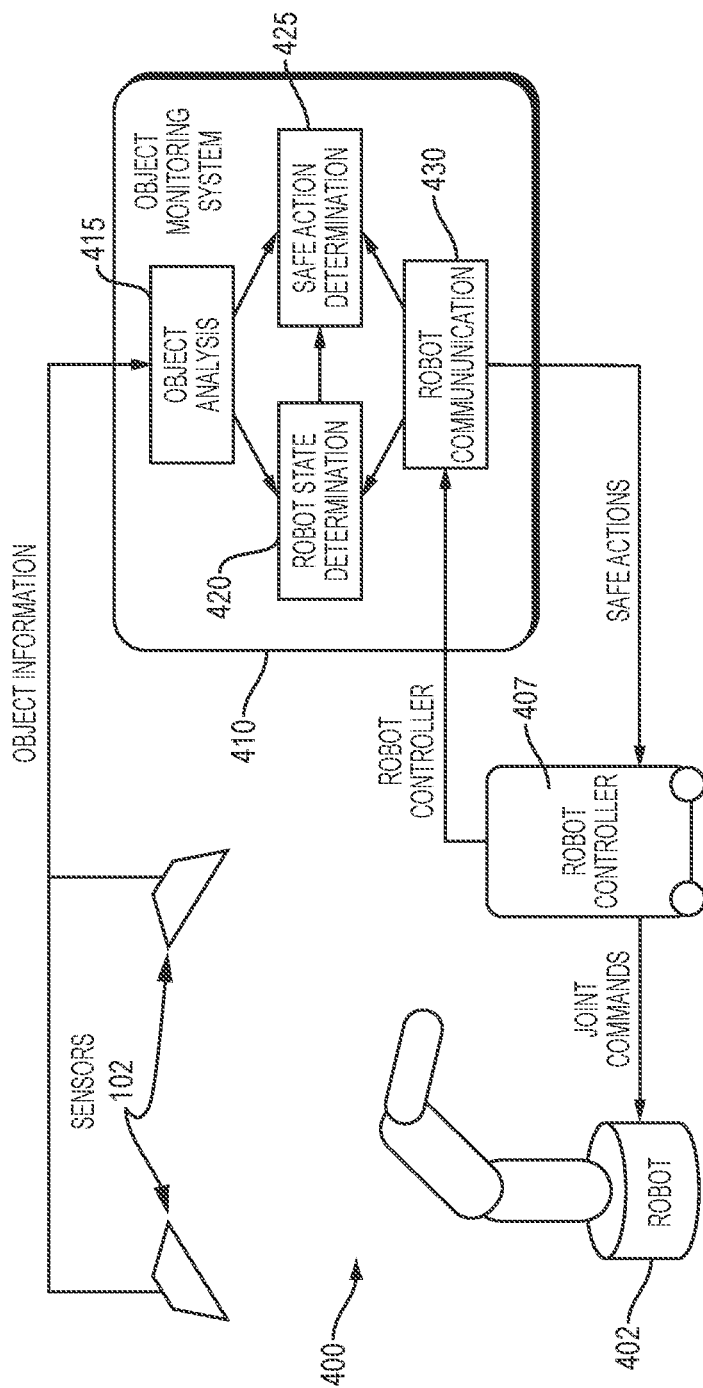
FIG. 4 schematically illustrates an object-monitoring system in accordance with an embodiment of the invention.

The operation of the system is best understood with reference to the conceptual illustration of system organization and operation of FIG. 4. As described above, a sensor array 102 monitors the workspace 400, which includes a robot 402. The robot's movements are controlled by a conventional robot controller 407, which may be part of or separate from the robot itself; for example, a single robot controller may issue commands to more than one robot.

The robot's activities may primarily involve a robot arm, the movements of which are orchestrated by robot controller 407 using joint commands that operate the robot arm joints to effect a desired movement. An object-monitoring system (OMS) 410 obtains information about objects from the sensors 102 and uses this sensor information to identify relevant objects in the workspace 400. OMS 410 communicates with robot controller 407 via any suitable wired or wireless protocol. (In an industrial robot, control electronics typically reside in an external control box. However, in the case of a robot with a built-in controller, OMS 410 communicates directly with the robot's onboard controller.) Using information obtained from the robot (and, typically, sensors 102), OMS 410 determines the robot's current state. OMS 410 thereupon determines safe-action constraints for robot 402 given the robot's current state and all identified relevant objects. Finally, OMS 410 communicates the safe action constraints to robot 407. (It will be appreciated that, with reference to FIG. 3, the functions of OMS 410 are performed in a control system 112 by analysis module 342 and, in some cases, a control routine 350.)

4.1 Identifying Relevant Objects

The sensors 102 provide real-time image information that is analyzed by an object-analysis module 415 at a fixed frequency in the manner discussed above; in particular, at each cycle, object analysis module 415 identifies the precise 3D location and extent of all objects in workspace 400 that are either within the robot's reach or that could move into the robot's reach at conservative expected velocities. If not all of the relevant volume is within the collective field of view of the sensors 102, OMS 410 may be configured to so determine and indicate the location and extent of all fixed objects within that region (or a conservative superset of those objects) and/or verify that other guarding techniques have been used to prevent access to unmonitored areas.

4.2 Determining Robot State

A robot state determination module (RSDM) 420 is responsive to data from sensors 102 and signals from the robot 402 and/or robot controller 407 to determine the instantaneous state of the robot. In particular, RSDM 420 determines the pose and location of robot 402 within workspace 400; this may be achieved using sensors 102, signals from the robot and/or its controller, or data from some combination of these sources. RSDM 420 may also determine the instantaneous velocity of robot 402 or any appendage thereof; in addition, knowledge of the robot's instantaneous joint accelerations or torques, or planned future trajectory may be needed in order to determine safe motion constraints for the subsequent cycle as described below. Typically, this information comes from robot controller 407, but in some cases may be inferred directly from images recorded by sensors 102 as described below.

For example, these data could be provided by the robot 402 or the robot controller 407 via a safety-rated communication protocol providing access to safety-rated data. The 3D pose of the robot may then be determined by combining provided joint positions with a static 3D model of each link to obtain the 3D shape of the entire robot 402.

In some cases, the robot may provide an interface to obtain joint positions that is not safety-rated, in which case the joint positions can be verified against images from sensors 102 (using, for example, safety-rated software). For example, received joint positions may be combined with static 3D models of each link to generate a 3D model of the entire robot 402. This 3D image can be used to remove any objects in the sensing data that are part of the robot itself. If the joint positions are correct, this will fully eliminate all object data attributed to the robot 402. If, however, the joint positions are incorrect, the true position of robot 402 will diverge from the model, and some parts of the detected robot will not be removed. Those points will then appear as a foreign object in the new cycle. In the previous cycle, it can be assumed that the joint positions were correct because otherwise robot 402 would have been halted. Since the base joint of the robot does not move, at least one of the divergent points must be close to the robot. The detection of an unexpected object close to robot 402 can then be used to trigger an error condition, which will cause robot controller 407 to transition robot 402 to a safe state. Alternately, sensor data can be used to identify the position of the robot using a correlation algorithm, such as described above in the section on registration, and this detected position can be compared with the joint position reported by the robot. If the joint position information provided by robot 402 has been validated in this manner, it can be used to validate joint velocity information, which can then be used to predict future joint positions. If these positions are inconsistent with previously validated actual joint positions, the program can similarly trigger an error condition. These techniques enable use of a non-safety-rated interface to produce data that can then be used to perform additional safety functions.

Finally, RSDM 420 may be configured to determine the robot's joint state using only image information provided by sensors 102, without any information provided by robot 402 or controller 407. Given a model of all of the links in the robot, any of several conventional, well-known computer vision techniques can be used by RSDM 420 to register the model to sensor data, thus determining the location of the modeled object in the image. For example, the ICP algorithm (discussed above) minimizes the difference between two 3D point clouds. ICP often provides a locally optimal solution efficiently, and thus can be used accurately if the approximate location is already known. This will be the case if the algorithm is run every cycle, since robot 402 cannot have moved far from its previous position. Accordingly, globally optimal registration techniques, which may not be efficient enough to run in real time, are not required. Digital filters such as Kalman filters or particle filters can then be used to determine instantaneous joint velocities given the joint positions identified by the registration algorithm.

These image-based monitoring techniques often rely on being run at each system cycle, and on the assumption that the system was in a safe state at the previous cycle. Therefore, a test may be executed when robot 402 is started—for example, confirming that the robot is in a known, pre-configured "home" position and that all joint velocities are zero. It is common for automated equipment to have a set of tests that are executed by an operator at a fixed interval, for example, when the equipment is started up or on shift changes. Reliable state analysis typically requires an accurate model of each robot link. This model can be obtained a priori, e.g. from 3D CAD files provided by the robot manufacturer or generated by industrial engineers for a specific project. However, such models may not be available, at least not for the robot and all of the possible attachments it may have.

In this case, it is possible for RSDM 420 to create the model itself, e.g., using sensors 102. This may be done in a separate training mode where robot 402 runs through a set of motions, e.g., the motions that are intended for use in the given application and/or a set of motions designed to provide sensors 102 with appropriate views of each link. It is possible, but not necessary, to provide some basic information about the robot a priori, such as the lengths and rotational axes of each link. During this training mode, RSDM 420 generates a 3D model of each link, complete with all necessary attachments. This model can then be used by RSDM 420 in conjunction with sensor images to determine the robot state.

4.3 Determining Safe-Action Constraints

In traditional axis- and rate-limitation applications, an industrial engineer calculates what actions are safe for a robot, given the planned trajectory of the robot and the layout of the workspace—forbidding some areas of the robot's range of motion altogether and limiting speed in other areas. These limits assume a fixed, static workplace environment. Here we are concerned with dynamic environments in which objects and people come, go, and change position; hence, safe actions are calculated by a safe-action determination module (SADM) 425 in real time based on all sensed relevant objects and on the current state of robot 402, and these safe actions may be updated each cycle. In order to be considered safe, actions should ensure that robot 402 does not collide with any stationary object, and also that robot 402 does not come into contact with a person who may be moving toward the robot. Since robot 402 has some maximum possible deceleration, controller 407 should be instructed to begin slowing the robot down sufficiently in advance to ensure that it can reach a complete stop before contact is made.

Figure 5:
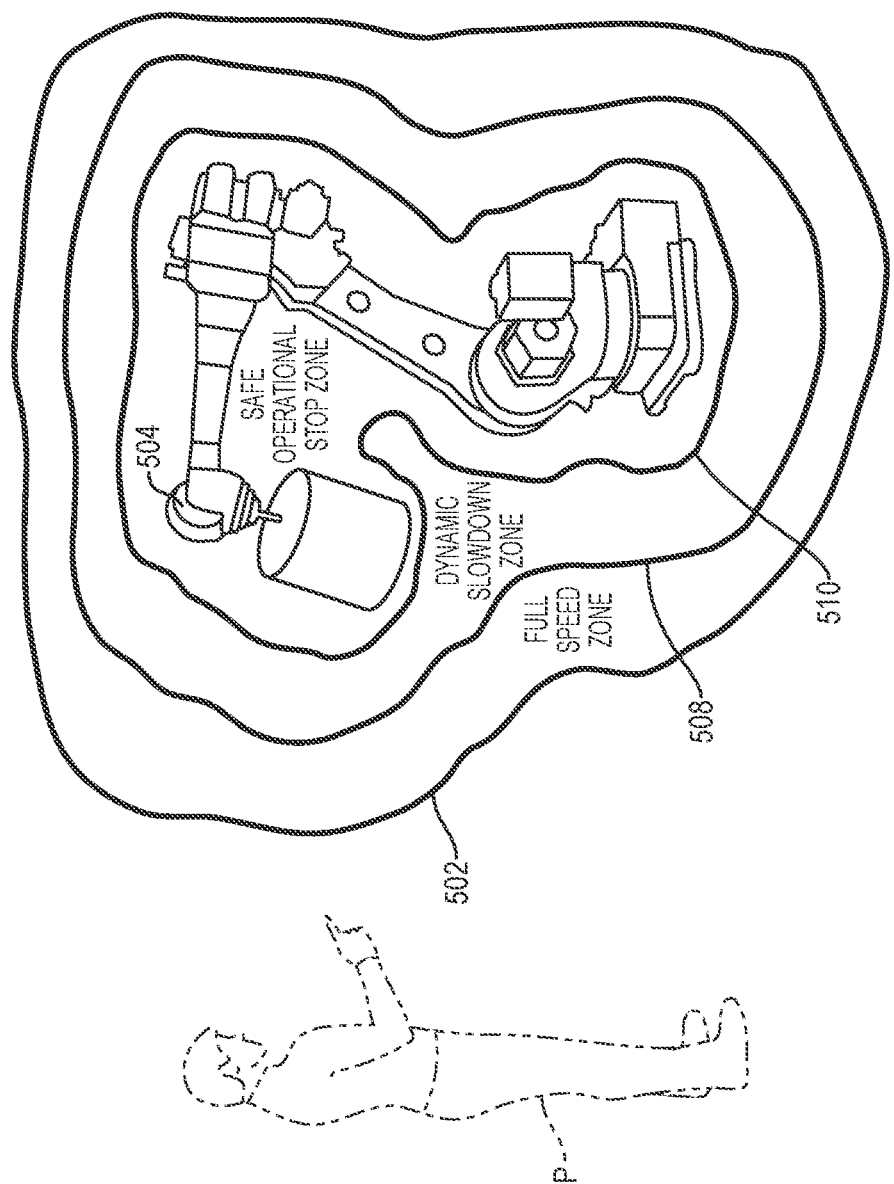
FIG. 5 schematically illustrates the definition of progressive safety envelopes in proximity to a piece of industrial machinery.

One approach to achieving this is to modulate the robot's maximum velocity (by which is meant the velocity of the robot itself or any appendage thereof) proportionally to the minimum distance between any point on the robot and any point in the relevant set of sensed objects to be avoided. The robot is allowed to operate at maximum speed when the closest object is further away than some threshold distance beyond which collisions are not a concern, and the robot is halted altogether if an object is within a certain minimum distance. Sufficient margin can be added to the specified distances to account for movement of relevant objects or humans toward the robot at some maximum realistic velocity. This is illustrated in FIG. 5. An outer envelope or 3D zone 502 is generated computationally by SADM 425 around the robot 504. Outside this zone 502, all movements of the person P are considered safe because, within an operational cycle, they cannot bring the person sufficiently close to the robot 504 to pose a danger. Detection of any portion of the person P's body within a second 3D zone or volume 508, computationally defined within zone 502, is registered by SADM 425 but robot 504 is allowed to continue operating at full speed. If any portion of the person P crosses the threshold of zone 508 but is still outside an interior danger zone 510, robot 504 is signaled to operate at a slower speed. If any portion of the person P crosses into the danger zone 510—or is predicted to do so within the next cycle based on a model of human movement—operation of robot 504 is halted. These zones may be updated if robot 504 is moved (or moves) within the environment.

A refinement of this technique is for SADM 425 to control maximum velocity proportionally to the square root of the minimum distance, which reflects the fact that in a constant-deceleration scenario, velocity changes proportionally to the square root of the distance traveled, resulting in a smoother and more efficient, but still equally safe, result. A further refinement is for SADM 425 to modulate maximum velocity proportionally to the minimum possible time to collision—that is, to project the robot's current state forward in time, project the intrusions toward the robot trajectory, and identify the nearest potential collision. This refinement has the advantage that the robot will move more quickly away from an obstacle than toward it, which maximizes throughput while still correctly preserving safety. Since the robot's future trajectory depends not just on its current velocity but on subsequent commands, SADM 425 may consider all points reachable by robot 402 within a certain reaction time given its current joint positions and velocities, and cause control signals to be issued based on the minimum collision time among any of these states. Yet a further refinement is for SADM 425 to take into account the entire planned trajectory of the robot when making this calculation, rather than simply the instantaneous joint velocities. Additionally, SADM 425 may, via robot controller 407, alter the robot's trajectory, rather than simply alter the maximum speed along that trajectory. It is possible to choose from among a fixed set of trajectories one that reduces or eliminates potential collisions, or even to generate a new trajectory on the fly.

While not necessarily a safety violation, collisions with static elements of the workspace are generally not desirable. The set of relevant objects can include all objects in the workspace, including both static background such as walls and tables, and moving objects such as workpieces and human workers. Either from prior configuration or run-time detection, sensors 102 and analysis module 342 may be able to infer which objects could possibly be moving. In this case, any of the algorithms described above can be refined to leave additional margins to account for objects that might be moving, but to eliminate those margins for objects that are known to be static, so as not to reduce throughput unnecessarily but still automatically eliminate the possibility of collisions with static parts of the workcell.

Beyond simply leaving margins to account for the maximum velocity of potentially moving objects, state estimation techniques based on information detected by the sensing system can be used to project the movements of humans and other objects forward in time, thus expanding the control options available to control routines 350. For example, skeletal tracking techniques can be used to identify moving limbs of humans that have been detected and limit potential collisions based on properties of the human body and estimated movements of, e.g., a person's arm rather than the entire person.

4.4 Communicating Safe Action Constraints to the Robot

The safe-action constraints identified by SADM 425 may be communicated by OMS 410 to robot controller 407 on each cycle via a robot communication module 430. As described above, a communication module may correspond to an I/O port 327 interface to a complementary port on robot controller 407 or may correspond to transceiver 325. Most industrial robots provide a variety of interfaces for use with external devices. A suitable interface should operate with low latency at least at the control frequency of the system. The interface can be configured to allow the robot to be programmed and run as usual, with a maximum velocity being sent over the interface. Alternatively, some interfaces allow for trajectories to be delivered in the form of waypoints. Using this type of an interface, the intended trajectory of robot 402 can be received and stored within OMS 410, which may then generate waypoints that are closer together or further apart depending on the safe-action constraints. Similarly, an interface that allows input of target joint torques can be used to drive trajectories computed in accordance herewith. These types of interface can also be used where SADM 425 chooses new trajectories or modifies trajectories depending on the safe-action constraints.

As with the interface used to determine robot state, if robot 402 supports a safety-rated protocol that provides real-time access to the relevant safety-rated control inputs, this may be sufficient. However, if a safety-rated protocol is not available, additional safety-rated software on the system can be used to ensure that the entire system remains safe. For example, SADM 425 may determine the expected speed and position of the robot if the robot is operating in accordance with the safe actions that have been communicated. SADM 425 then determines the robot's actual state as described above. If the robot's actions do not correspond to the expected actions, SADM 425 causes the robot to transition to a safe state, typically using an emergency stop signal. This effectively implements a real-time safety-rated control scheme without requiring a real-time safety-rated interface beyond a safety-rated stopping mechanism.

In some cases a hybrid system may be optimal—many robots have a digital input that can be used to hold a safety-monitored stop. It may be desirable to use a communication protocol for variable speed, for example, when intruding objects are relatively far from the robot, but to use a digital safety-monitored stop when the robot must come to a complete stop, for example, when intruding objects are close to the robot.

5. Dynamic Signaling of Safety Levels

Figure 6:
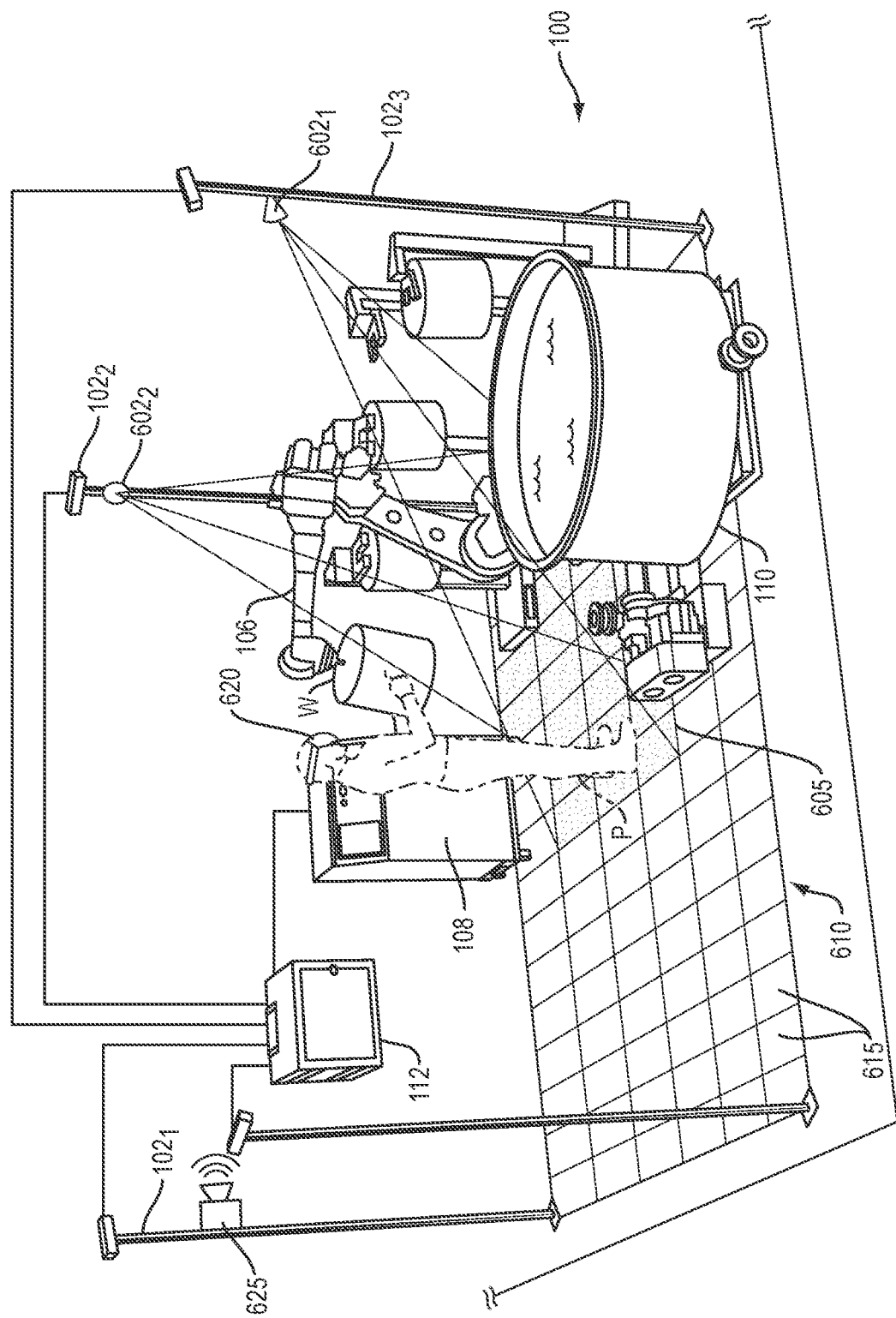
FIG. 6 schematically illustrates a monitored workspace including various modes of safety signaling.

FIG. 6 illustrates the monitored space 100 shown in FIG. 1 but with various modalities to signal surrounding safety levels as the person P moves through the space 100. In this way, personnel may avoid regions of the workspace that would cause robot controller 108 to limit, slow or stop altogether the movements of robot 106. The signaled safety levels and associated regions or zones of the space 100 may, for example, be determined by SADM 425 (see FIG. 4), deployed in control system 112, based on classification of non-static machinery in the space (in this case, robot 106) and its state and potential movements. As described above with reference to FIG. 5, all movements outside zone 502 are considered safe, so it would be desirable for the person P to confine his movements so as to remain outside this zone to the extent practicable. Hence, in one embodiment, zone 502 is illuminated with light of a signaling color (e.g., red) while regions outside zone 502 are either unilluminated or illuminated with a color (e.g., green) signaling safe movement.

To achieve this differential illumination, whose pattern may vary over time if robot 106 itself moves (or is moved) within the space 100, a series of controllable lamps representatively indicated at 6021, 6022 may be distributed about the space 100. Control system 112 operates lamps 600 via wired or wireless communication, and the lamps are responsive to two-axis rotation commands and commands that specify the color of the emitted illumination. Thus, as illustrated in FIG. 6, control system 112 defines an unsafe zone 605 corresponding to the outer envelope of potential movement of robot 106. This zone may be defined by the full kinematic capabilities of robot 106 or, instead, by the task in which the robot is presently engaged (possibly reducing the extent of zone 605 and allowing the person P greater freedom of movement). After computing the proper extent of zone 605, control system 112 determines which illumination devices can best illuminate the zone—in this case, lamps 6021, 6022 are selected—and issues positioning commands to these lamps so that their light outputs will be directed at zone 605. Control system 112 also issues commands specifying the illumination color and, if appropriate, the output intensity. The illumination clearly indicates the unsafe zone 605 to the person P, who enters the zone only when intentionally interacting with robot 106.

Alternatively, all or a portion 610 of the workspace floor may consist of individually addressable tiles 615 that emit light of a selectable color. Tiles with embedded light-emitting diodes are conventional and readily available. In this case, control system 112 operates the tiles 615 corresponding to zone 605 to emit, for example, red light. Tiles 615 outside zone 605 may emit, for example, green light. Given the ease of addressing individual and groups of tiles 615 corresponding to arbitrary zones, one or more additional colors corresponding to zones 508 and/or 510 may be activated; for example, tiles corresponding to zone 502 may be activated to emit yellow light, tiles corresponding to zone 508 may emit orange light, and tiles within zone 510 may emit red light.

Alternatively, the person P may wear a "virtual reality" (VR), "augmented reality" (AR), or "mixed reality" (MR)

headset headset 620. A VR headset, such as the OCULUS, provides a fully immersive experience in which the entire space 100 is presented to the person P via headset 620 as a projected environment. An AR headset presents an interactive experience of a real-world environment where the space 100 and objects residing therein are visible to the person P but enhanced by computer-generated perceptual information, e.g., translucent color overlays corresponding to one or more zones. AR headsets include GOOGLE GLASS and the Epson MOVERIO. An MR headset, such as Microsoft HOLOLENS, presents an interactive experience similar to an AR headset where the space 100 and objects therein are visible to the person P, in addition to visualizing computer-generated objects such as 3D CAD models as if they were present in the real world. As used herein, the term "virtual reality" and the abbreviation VR refer collectively and individually to AR, VR and MR headsets. In use, headset 620 receives commands via wired or wireless connection from control system 112, which causes headset 620 to deliver a projected environment (in the case of VR) or colored overlays (in the case of AR) to the headset's wearer to indicate safety zones based on the wearer's current location in the space 100.

Even more simply, an audible alarm 625 or other audible signal may sound when the person P approaches or enters a safety zone. The amplitude, frequency or a spoken voice may be tailored to alert the hearer to escalating levels of safety monitoring.

The signaling approach described herein has applications beyond visualizing safety conditions. Visualization can, for example, allow a human operator to recognize when a robot is being controlled mistakenly—for example, if a large box was placed on a table, SADM 425 may stop the robot because it cannot guarantee that box is not human. Without a clear visualization, issues like this one could become serious problems in a production line because they will require time and effort to resolve, whereas with an appropriate visualization, troubleshooting and fixing the problem can be trivial and immediate.

Extending signaling capabilities beyond situations where a system-recognized human interacts with a robot having a known location and characteristics requires broader computer-vision capabilities. In particular, OMS 410 may have capabilities extending beyond using information obtained from sensors 102 to identify and classify relevant objects in the workspace; it may, for example, be capable of distinguishing voxel clusters at a pre-object "feature" level. By "feature" is meant a visual element relevant to a safety-related condition or metric. A feature may be observed or computationally based. An observed feature is an element of the scene that actually appears in a sensor image or a representation of such an element (for example, a robot or a region occupied by a human, represented by, e.g., a voxel cluster, a depth image, or a mesh). A computationally generated feature may be a region in space or a relationship among other features (for example, a protective separation distance (PSD) between objects or a classification of voxels as, for example, belonging to an entry point).

Observed features may include physical entities such as the robot, a workpiece, or a human. Computationally generated features may include a volume of unknown voxels that does not correspond to any observed object but is large enough that it may contain an object relevant to a safety-related condition or metric. This feature is computationally generated because it does not correspond to voxels actually observed by a sensor. Computationally generated features may also include computationally defined spatial regions, e.g., the outer envelope of potential movement of robot as described above, a keep-in zone, a keep-out zone, an entry point in the workspace, or workspace voxels that sensors 102 currently cannot observe or which cannot be classified. Such computationally generated features may be represented explicitly as voxels or in any other convenient representation. Still further, a computationally generated feature may define a relationship (e.g., distance) among other features or classified objects in the workspace.

An observed feature may be initially unclassified or unidentified. For example, a cluster of voxels recorded by one or more sensing elements may not be classifiable as a known object, and may therefore represent an unrecognized physical item in the workspace or possibly a spurious accident of imaging. The decision whether to ignore or retain the cluster for visualization purposes (i.e., to make it visible to users of the system) may depend not only on its size but its location or relationship to other features or objects. If minimum specified criteria are not met (e.g., the voxel cluster is very small), it can be safely ignored by OMS 410. However, observed features that would otherwise be ignored may be retained if they are located at or near an entry point (particularly near the edge of an entry point) to the workspace, since these offer access to humans (or appendages) and, as a result, there is a higher chance that the feature should be considered for safety purposes.

Figure 7:
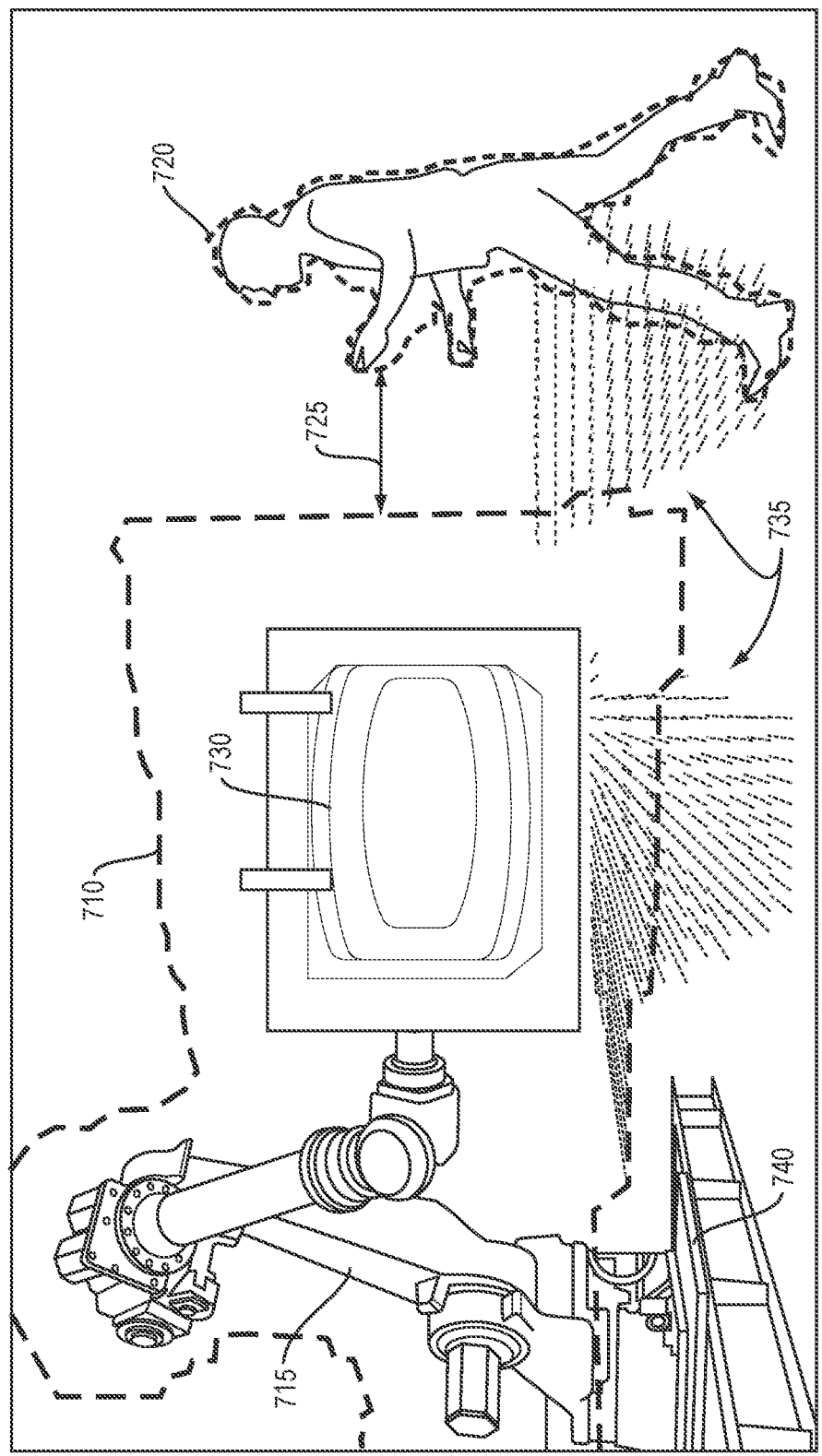
FIG. 7 is an exemplary 2D representation of a 3D workspace showing features relevant to monitoring and safety.

This enhanced, feature-level representation facilitates visualization of elements important to conditions of interest (such as safety), but which may correspond, for example, to unclassified objects, regions invisible to the sensors, or relationships among objects. For example, control system 112 may responsively highlight, on a VR/AR headset 620 or using a rendered 3D image on a 2D display. In order to be most effective, these visualizations will show three-dimensionality. For example, a 2D image of 3D information can be overlaid on a CAD or camera image of a human-visible representation of the space, e.g., on a monitor as illustrated in FIG. 7, which shows the spatial region 710 reachable by a moving robot 715 in performing a task; a spatial region 720 potentially occupied by a human and the closest distance between spatial regions 710, 720 (corresponding to the minimum distance between a human and the robot envelope), visually represented as a line 725 connecting them. Objects being tracked by OMS 410 may be rendered in a color corresponding to status information, such as whether the object is a workpiece 730, and similarly, if the location of workpiece 730 deviates from an expected location, the deviation can be signaled with another color or other visual signal (such as borders showing the actual and expected locations). Recognized objects may also be labeled. Anticipated conditions, such as whether a slowdown or stop is necessary or soon will be if the robot and human were to move closer to each other, can be indicated, for example, by the color of the minimum-distance line 725. Unknown spatial regions 735 may be rendered in a characteristic color and/or labeled. The observed scene may be rendered, e.g., in grayscale so that the colored spatial regions and borders are easily visible. Recognized static elements, such as the platform 740, may be indicated as such on the grayscale image.

Alternatively, the image can be projected onto the workcell floor. Additionally, colored lights may be used to indicate a subset of the information in a coarser form. To assist the viewer of a 2D display in orienting their perception, the representation can include CAD models of workcell fixtures that are not necessarily used by the system but that are easily recognizable by the human. Alternatively, sensor data (3D or RGB) can be used to generate a 3D reconstruction of the workcell over which system observations and computationally generated features can be overlaid. Such representations may be presented using AR/VR display techniques. In this way, a human worker can easily map the elements of the visualization onto the physical space around them.

Certain embodiments of the present invention are described above. It is, however, expressly noted that the present invention is not limited to those embodiments; rather, additions and modifications to what is expressly described herein are also included within the scope of the invention.

What is claimed is:

1. A system for perceptibly indicating information in a digitally represented three-dimensional (3D) workspace including industrial machinery, the system comprising:
    a plurality of sensors distributed about the workspace, each of the sensors comprising a grid of pixels for recording images of a portion of the workspace within a sensor field of view, the workspace portions collectively covering the entire workspace;
    a computer memory for storing (i) a plurality of images from the sensors and (ii) a model of the machinery and its permitted movements during performance of the activity;
    a source for generating perceptible signals; and
    a processor configured to:
        computationally generate, from the stored images, a 3D spatial representation of the workspace;
        identify, from the images, at least one observed feature appearing in at least one of the images from the sensors;
        generate, based on analysis of the sensed workspace, at least one computationally based feature not appearing in any of the images from the sensors; and
        operate the signal source to perceptibly indicate at least one observed feature and at least one computationally based feature.

2. The system of claim 1, wherein each observed feature is represented in the computer memory as a voxel cluster, a depth image, a mesh, a bounding box, or a line.

3. The system of claim 1, wherein:
    a first one of the observed features is machinery;
    a first one of the computationally based features is a 3D envelope around the machinery in the workspace and spanning permitted movements of the machinery in accordance with a stored model; and
    a second one of the computationally based features is space potentially occupied by a human or a human appendage.

4. The system of claim 3, wherein a third one of the computationally based features is a minimum distance between the first and second computationally based features, the signal source being operable by the processor to show the third computationally based feature as a line between the first and second computationally based features.

5. The system of claim 3, wherein the signal source is operable by the processor to show whether a slowdown or stop is necessary or is predicted to become necessary within a predetermined time based on a minimum distance between the first and second computationally based features.

6. The system of claim 1, wherein a first one of the observed features is a recognized physical object in the workspace and the signal source is operable by the processor to display a representation of the object with a color indicating its type.

7. The system of claim 6, wherein the signal source is operable by the processor to display contents of the workspace in grayscale as a background.

8. The system of claim 1, wherein a first one of the observed features is a recognized workpiece in the workspace and the signal source is operable by the processor to display a representation of the workpiece showing a deviation from an expected position thereof.

9. The system of claim 1, wherein a first one of the computationally generated features is a keep-out zone, the signal source being operable by the processor to display a representation of the keep-out zone in the workspace.

10. The system of claim 1, wherein a first one of the computationally generated features is a keep-in zone, the signal source being operable by the processor to display a representation of the keep-in zone in the workspace.

11. The system of claim 1, wherein a first one of the computationally generated features is a cluster of voxels corresponding to a spatial region in the workspace that none of the sensors can observe, the signal source being operable by the processor to display the cluster of voxels in a representation of the workspace.

12. The system of claim 1, the signal source is operable by the processor to display a representation of an object with a color indicating its state.

13. The system of claim 1, wherein the signal source is a VR headset.

14. The system of claim 1, wherein the signal source is a 2D display.

15. A method of perceptibly indicating information associated with voxel clusters in a digitally represented three-dimensional (3D) workspace including industrial machinery, the method comprising the steps of:
    monitoring the workspace with a plurality of sensors distributed thereabout, each of the sensors comprising a grid of pixels for recording images of a portion of the workspace within a sensor field of view, the workspace portions collectively covering the entire workspace;
    registering the sensors with respect to each other so that the images obtained by the sensors collectively represent the workspace;
    storing, in a computer memory, (i) a plurality of images from the sensors and (ii) a model of the machinery and its permitted movements during performance of the activity;
    computationally generating, from the stored images, a 3D spatial representation of the workspace;
    computationally identifying, from the images, at least one observed feature appearing in at least one of the images from the sensors;
    generating, based on analysis of the sensed workspace, at least one computationally based feature not appearing in any of the images from the sensors; and
    generating a signal to perceptibly indicate at least one observed feature and at least one computationally based feature.

16. The method of claim 15, wherein each observed feature is digitally represented as a voxel cluster, a depth image, a mesh, a bounding box, or a line.

17. The method of claim 15, wherein:
    a first one of the identified computationally based features is a 3D envelope around machinery in the workspace and spanning permitted movements of the machinery in accordance with a stored model; and
    a second one of the computationally based features is space potentially occupied by a human or a human appendage.

18. The method of claim 17, wherein a third one of the computationally based features is a minimum distance between the first and second computationally based features, the signal showing the third computationally based feature as a line between the first and second computationally based features.

19. The method of claim 17, wherein the signal shows whether a slowdown or stop is necessary or is predicted to become necessary within a predetermined time based on a minimum distance between the first and second computationally based features.

20. The method of claim 15, wherein a first one of the observed features is a recognized physical object in the workspace and the signal causes display of a representation of the object with a color overlay indicating its type.

21. The method of claim 15, wherein a first one of the observed features is a recognized workpiece and the signal causes display of a representation of the workpiece showing a deviation from an expected position thereof.

22. The method of claim 15, wherein a first one of the computationally generated features is a keep-out zone and the signal causes display of a representation of the keep-out zone in the workspace.

23. The method of claim 15, wherein a first one of the computationally generated features is a keep-in zone, the signal source causing display of a representation of the keep-in zone in the workspace.

24. The method of claim 15, wherein a first one of the computationally generated features is a cluster of voxels corresponding to a spatial region in the workspace that none of the sensors can observe, the signal causing display of the cluster of voxels in a representation of the workspace.

* * * * *